United States Patent [19]

Niemeyer

[11] 4,443,915

[45] Apr. 24, 1984

[54] CORD LOCKING DEVICE FOR A SUN-BLIND OR THE LIKE

[75] Inventor: Remmelt C. Niemeyer, Enschede, Netherlands

[73] Assignee: Verosol B.V., Enschede, Netherlands

[21] Appl. No.: 235,769

[22] Filed: Feb. 18, 1981

[30] Foreign Application Priority Data

Nov. 3, 1980 [NL] Netherlands ........................ 8006008

[51] Int. Cl.$^3$ .............................................. F16G 11/00

[52] U.S. Cl. .......................... 24/132 R; 24/132 WL; 160/178 C

[58] Field of Search ......... 24/132 R, 132 WL, 115 L, 24/120; 160/178 C, 370, 173

[56] References Cited

U.S. PATENT DOCUMENTS

| | | | |
|---|---|---|---|
| 764,773 | 7/1904 | Sall et al. | 24/132 R |
| 1,243,109 | 10/1917 | Richardson | 160/178 C |
| 1,737,406 | 11/1929 | Bocchino | 160/178 C |
| 2,214,155 | 9/1940 | Ajouelo | 24/132 R |
| 3,960,149 | 6/1976 | Bujan | 24/115 L |
| 4,308,643 | 1/1982 | Montplaisir | 24/132 R |

*Primary Examiner*—Jay N. Eskovitz
*Attorney, Agent, or Firm*—Kenyon & Kenyon

[57] ABSTRACT

A locking device for cords of a sun-blind or the like having an upper beam and one or more webs of sun-blinding material connected thereto. The cords extend through the internal space of the upper beam and leave it for opening or closing the sun-blind. The locking device consists of a U-shaped portion in the legs of which a tumbler is pivotably supported at the one end. The free end of the tumbler is biased in the direction of the bottom of the U-shaped portion. The cords extend between the free end of the tumbler and the bottom of the U-shaped portion and are locked when they are clamped between said free end and bottom resulting from the bias force.

6 Claims, 6 Drawing Figures

CORD LOCKING DEVICE FOR A SUN-BLIND OR THE LIKE

The invention relates to a locking device for the cords of a sunblind or the like provided with an upper beam and one or more webs from sun-blinding material connected thereto, preferably material folded in a zigzag line, in which the cords are introduced through holes in the upper beam, extend through the inner space of the upper beam to one end of the upper beam and therefrom to the outside for opening or closing the sun-blind.

Such a sun-blind is known from the Dutch patent application No. 7307075 laid out to public inspection.

In said known sun-blind at both ends of the upper beam an endstop is provided, one of said endstops is provided with a hole for introducing a number of cords. In the practically used embodiment said cords, sometimes as much as nine pieces, are connected to one single cord by means of which the sun-blind may be pulled up and dropped. The fastening of said cord is carried out by means of a toggle affixed to the window-frame.

A need of a locking device exists which automatically locks the cords when they are not pulled anymore.

Such automatically operating locking devices are known indeed for sun-blinds provided with tilting lamellae. These blinds have a rather robust upper beam and the locking device may be built in therein, or affixed at its outside.

The mounting of the known locking device in the modest upper beam of the sunblind according to the Dutch patent application No. 7307075 is impossible because of lack of space.

When one affixes the known locking device against a headend of the upper beam the effective length for the upper beam is lost and the sun blinding material will not cover the entire window.

When one provides the known locking device against the bottom of the one end of the upper beam similar objection is in force.

When one provides the known locking device against the front of the one end of the upper-beam the relative large housing of the locking device defaces the modest upper-beam.

Therefore, the inventor has looked for an automatically operating cord locking device being small such that it may be built in at the location of the one endstop or in a little defacing way against the external side of the one end of the upper beam.

According to the invention, this is achieved because the locking device consists of a U-shaped portion having a flat bottom and legs, said portion has its end provided with a cross-plate, in which an inlet hole for a number of cords is provided and of a tumbler having a pivot shaft near its upper end, said pivot shaft is journalled in the legs of the U-shaped portion near the upper sides of the legs, in which in the vertical position the tumbler substantially fills up the space between the legs and the bottom under the pivot shaft and the lower edge of the tumbler is spaced from the bottom by a distance smaller than the thickness of the cords which should extend between the bottom and the lower edge, said tumbler is loaded by force of gravity and auxiliary force to the approximately vertical position in which the cords are locked, which auxiliary force is freed or called in by horizontal displacement of the cords within the inlet hole.

By pulling one or more cords forwards or backwards, generally forwards, thus away from the window surface this cord is lifted so that the tumbler swings upwards and frees the cords.

According to a preferred embodiment of the invention the crossplate is provided with a seat for a member which is slidable in vertical direction, carrying a lip or the like, the free end of which may cooperate with the adjacent face of the tumbler, whereby in the portion of the slidable member, which is lying in the cross-plate an inlet hole for the cords is provided substantially coinciding with the inlet hole in the cross-plate, whereby the bottoms of the inlet holes at least partly are sloping upwardly in opposite direction.

Owing to the opposite slope of the bottoms of both inlet holes, at horizontal displacement of the cords towards one side away from the slope in the slidable member this member is freed, so that it does not urge longer the tumbler downwards.

The cords can pass below the tumbler to drop the blind.

At horizontal displacement of the cords in the opposite direction the cords are urging the slidable member and thus the tumbler downwards, so that the cords are maintained in each desired position of the blind.

There are also other possibilities for return of the tumbler to the locking position, if an operator no longer pulls the cords.

It will be apparent that the locking device according to the invention is not only suitable for sun-blinds in zigzag lines. Also for so-called "Venetian blinds" it can be used, or for other foldable or windable screenes which may be closed or opened by means of cords.

The invention will be further explained with reference to the drawing showing two embodiments, in which.

Figure 1:
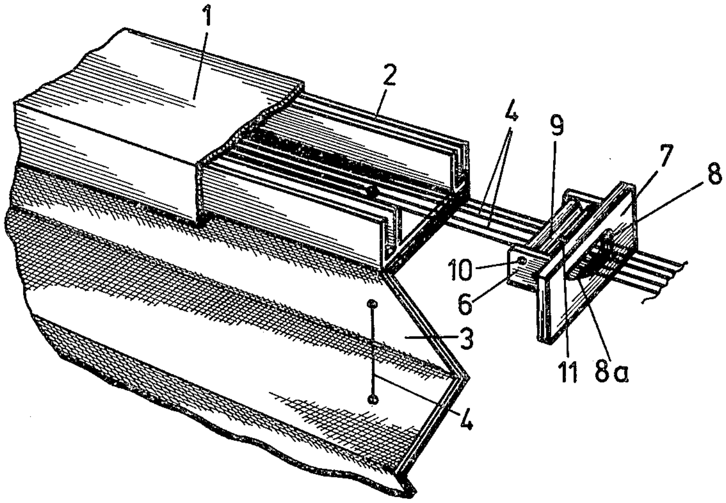
FIG. 1 is a perspective view of a portion of the upper-beam for a zigzag-folded sun-blind with the locking device spaced slightly therefrom according to the first embodiment.

In FIG. 1 the upper beam comprising two parts is referenced by 1 and 2. The external beam 1 consists in the known way of aluminium profile and the inner beam 2 in the known way of plastic. The web folded in a zigzag line is referenced by 3. The upper end of said web 3 is fastened to the inner beam 2.

Although, in FIG. 1 the external beam 1 is partly cut away, it will be obvious that the ends of the external beam 1 and of the inner beam 2 terminate in one plane.

Said end is closed at the side not shown by a plastic endstop, as shown in the Dutch patent application No. 7307075. At the end shown in FIG. 1, in the known construction also a plastic endstop is provided having an inlet hole for the cords indicated by 4.

The locking device according to the invention substituting the known endstop consists of a U-shaped portion having a bottom 5 and upstanding walls 6. Both the bottom 5 and the walls 6 are flat and are perpendicular to each other. At the right hand end a cross-plate 7 is provided in which an inlet hole 8 for the cords 4 is present.

Figure 2:
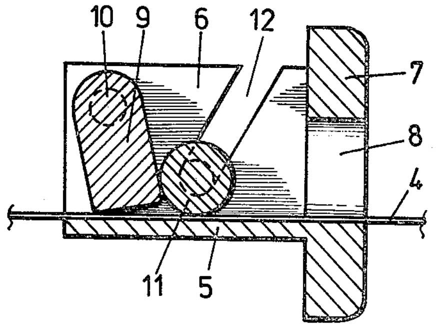
FIG. 2 shows a section along the axis of the locking device in the locked position.
Figure 3:
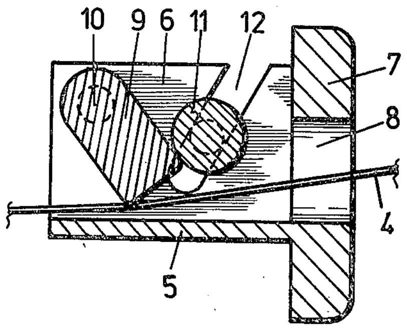
FIG. 3 is a corresponding section in the released position.

As it appears much clear from FIGS. 2 and 3 between the legs 6 a tumbler 9 is arranged being connected pivotably to the legs 6 at its upper end. For example this may be implemented by a thin shaft 10 inserted through holes in the legs 6 and through a through-going hole in the tumbler 9. In transverse direction the tumbler 9 fits between the legs 6 and may be moved freely with respect to them. The lower edge of the tumbler 9 is slightly spaced from the upper side of the bottom 5. Said distance is smaller than the diameter of the cords 4 for which the locking device is intended. This means that the tumbler slightly inclines with respect to the vertical plane, when cords 4 are at the upper side of the bottom 5.

It will be apparent that the tumbler 9 will try to adopt a vertical position by own weight so that the end position with provided cords 4 is represented by the position according to FIG. 2. In order to promote the movement into said end position an auxiliary weight 11 is provided in form of a metal cylinder having at its ends thin stubs fitting slidable in inclined slots 12 in the legs 6.

It will be clear that the auxiliary weight 11 assists in maintaining the tumbler 9 in the locked position.

When an operator pulls the cords 4, so in FIG. 2 to the right, the tumbler 9 and the auxiliary weight 11 move into the position according to FIG. 3, in which position the cords 4 are not locked anymore. By releasing the cords 4 they will move underneath the tumbler 9 so that the sun-blind may be closed.

In order to promote the release the inlet hole 8 has an upwards inclining portion 8*a* at its bottom. When the cords 4 are moved forward, thus from the window plane, some of said cords or at least one cord moves upwards across the inclining plane 8*a*, by which the tumbler 9 is urged to adopt the position according to FIG. 3.

It will be clear that all kinds of means may be used for displacing the tumbler 9 into the locked position. Thus, it is for example possible not using an auxiliary weight 11 but to implement the tumbler 9 itself additionally heavy. Another solution is to provide a torsion spring around the shaft 10, said torsion spring urges the tumbler 9 into the position according to FIG. 2. It is also possible to place a compression spring between the tumbler 9 and for example the cross-plate 7. All of said embodiments are not shown, but will simply be clear for those skilled in the art.

It is possible to cause the tumbler to move by magnetic forces. When the tumbler 9 consists of a permanent magnet and the bottom 5 of magnetisable material the permanent magnet will tend to move the tumbler 9 into the vertical position, which is prevented by the presence of the cords 4. Also on said bottom a locking of the cords 4 is possible. Self-evident, the permanent magnet may also be in the bottom 5, or the bottom 5 and the tumbler 9 may be implemented as a magnet each, but having opposite polarity.

The U-shaped portion and the cross-plate may be manufactured integrally from plastic.

Figure 4:
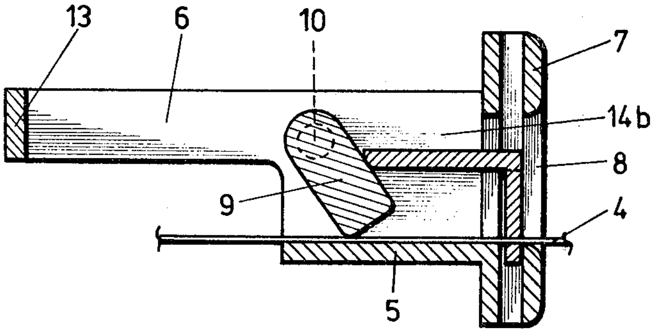
FIG. 4 shows the second preferred embodiment of the locking device according to the invention.
Figure 5:
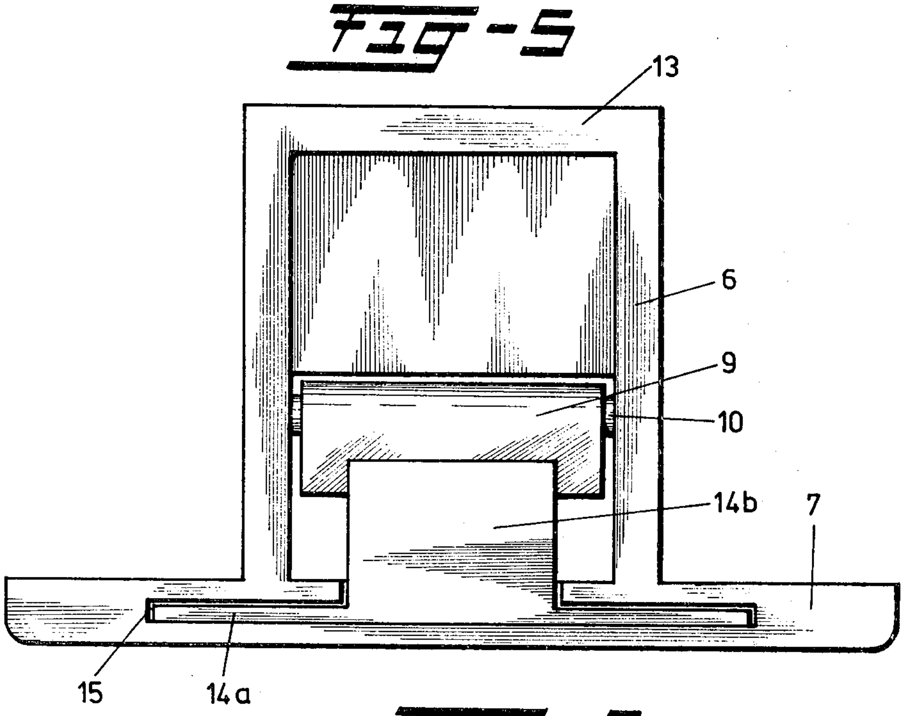
FIG. 5 is a top view of this preferred embodiment.
Figure 6:
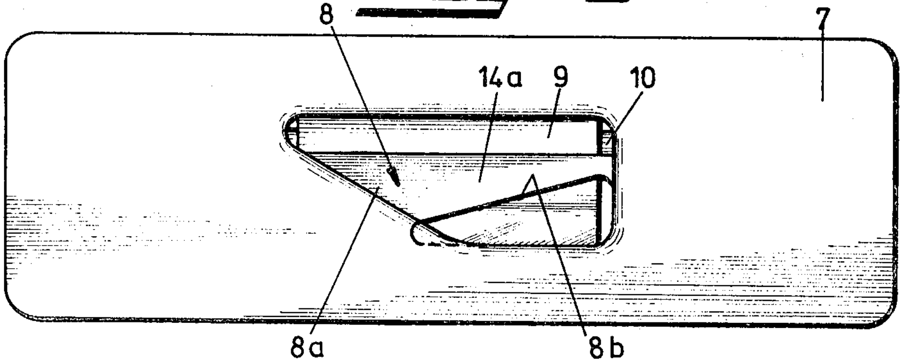
FIG. 6 is a front view thereof.

The preferred embodiment shown in FIGS. 4, 5 and 6 corresponds to the greater part to the first embodiment. Corresponding parts have been indicated with the same reference numbers.

The U-shaped portion 5,6 is somewhat shorter, but the legs 6 are provided with an extension 13 in order to make possible a sufficient attachment in the inner beam 2.

The auxiliary weight 11 is replaced by a slidable member 14. This member 14 consists of a rectangular vertical portion 14*a* and a rectangular horizontal lip 14*b*, perpendicular to each other.

The member 14 is preferably made as a unit from stainless steel.

The vertical portion 14*a* is slidably received in a slot 15 in the thick cross-plate 7.

From FIG. 4 it appears that when the member 14 is moving downwards, the free end of the lip 14*b* urges the tumbler 9 downwards and frees the tumbler when moving upwards.

These movements are carried out positively by moving the cords in the inlet hole 8 in the cross-plate 7 to the right resp. to the left.

To make this possible in the porition 14*a* of the member 14 also an inlet hole for the cords 4 is provided. This inlet hole corresponds completely to the inlet hole 8 in the cross-plate 7 with a bottom part 8*a*, inclining upwards to the left, but is turned over 180°. This means that the bottom part 8*b* of the inlet hole in the portion 14*a* is inclining upwards to the right.

In the rest position the cords 4 are in the valley between the slopes 8*a* and 8*b*. When the cords in FIG. 6 are moved to the left, they do not press longer on the slope 8*b* of the member 14. This member 14 is made free. Moreover, the cords 4 are moving upwards along the slope 8*a* and swing the tumbler 9 away from the cords 4. The blind can be dropped.

When after that the cords 4 are moved to the right in FIG. 5 they urge the member 14 and thus the tumbler 9 downwards.

I claim:

1. A locking device for the cords of a blind or the like, said blind including an upper beam and at least one web of sun-blinding material connected thereto, the cords of said blind entering into said upper beam at one end thereof and extending through the interior of said beam for raising and lowering said blind, said locking device comprising, a generally U-shaped member having a bottom and sides and an aperture at one end thereof adapted to receive at least one of said cords of said blind, said U-shaped member being adapted for slidable insertion into said upper beam at said one end thereof, a first tumbler member movably mounted in said U-shaped member and adapted for vertical movement in said U-shaped member toward and away from said bottom thereof and said cords of said blind, said cords extending through said aperture in said U-shaped member between said tumbler member and said bottom of said U-shaped member, said tumbler member being adapted for movement toward said bottom of said U-shaped member into locking engagement with said cords of said blind, said aperture in said U-shaped member including a cord-engaging surface which is at least partially inclined vertically upwardly away from said bottom of said U-shaped member in a direction transverse to the longitudinal axis of said upper beam, said cords of said blind being slidably engaged with said surface and being movable transversely thereover so as to move said tumbler member vertically upwardly away from said bottom of said U-shaped member out of engagement with said cords of said blind.

2. The locking device recited in claim 1, wherein said first tumbler member is pivotably mounted on said sides of said U-shaped member and is dimensioned so that when said tumbler member is disposed in engagement with said cords of said blind said tumbler member is spaced from said bottom of said U-shaped member by a distance which is smaller than the thickness of said cords of said blind.

3. The locking device recited in claim 1, further comprising a second tumbler member slidably disposed in said U-shaped member and adapted for vertical movement in said U-shaped member toward and away from said bottom thereof, said second tumbler member being further adapted for engagement with said first tumbler member during said vertical movement thereof for moving said first tumbler member into engagement with said cords of said blind.

4. The locking device recited in claim 3, wherein said second tumbler member comprises a cylindrical member slidably mounted at its ends in said sides of said U-shaped member and adapted for inclined movement towards and away from said first tumbler member, said cylindrical member being further adapted for movement into engagement with said first tumbler member by the force of gravity.

5. The locking device recited in claim 3, wherein said second tumbler member comprises a planar plate member slidably disposed in said U-shaped member adjacent to said aperture provided in said one end thereof, said plate member having an outwardly extending lip member directed toward said first tumbler member for engaging said first tumbler member when said plate member moves vertically downward towards said bottom of said U-shaped member, said plate member further including an aperture disposed adjacent said aperture provided in said U-shaped member and having a cord-engaging surface which is at least partially inclined upwardly away from said bottom of said U-shaped member in a direction transverse with respect to the longitudinal axis of said upper beam, said cords of said blinds being positioned so as to extend between said cord-engaging surfaces of said apertures in said plate member and said U-shaped member and to engage said surfaces and move said plate member vertically upwardly away from said bottom of said U-shaped member out of engagement with said first tumbler member when said cords are moved transversely with respect to the longitudinal axis of said upper beam.

6. The locking device recited in claim 5, wherein said cord-engaging surfaces of said apertures in said U-shaped member and said plate member are inclined in opposite directions upwardly away from said bottom of said U-shaped member.

* * * * *